Oct. 18, 1932.   H. E. IVES   1,883,290
PROJECTION OF STEREOSCOPIC PICTURES
Filed Oct. 23, 1930   2 Sheets-Sheet 1
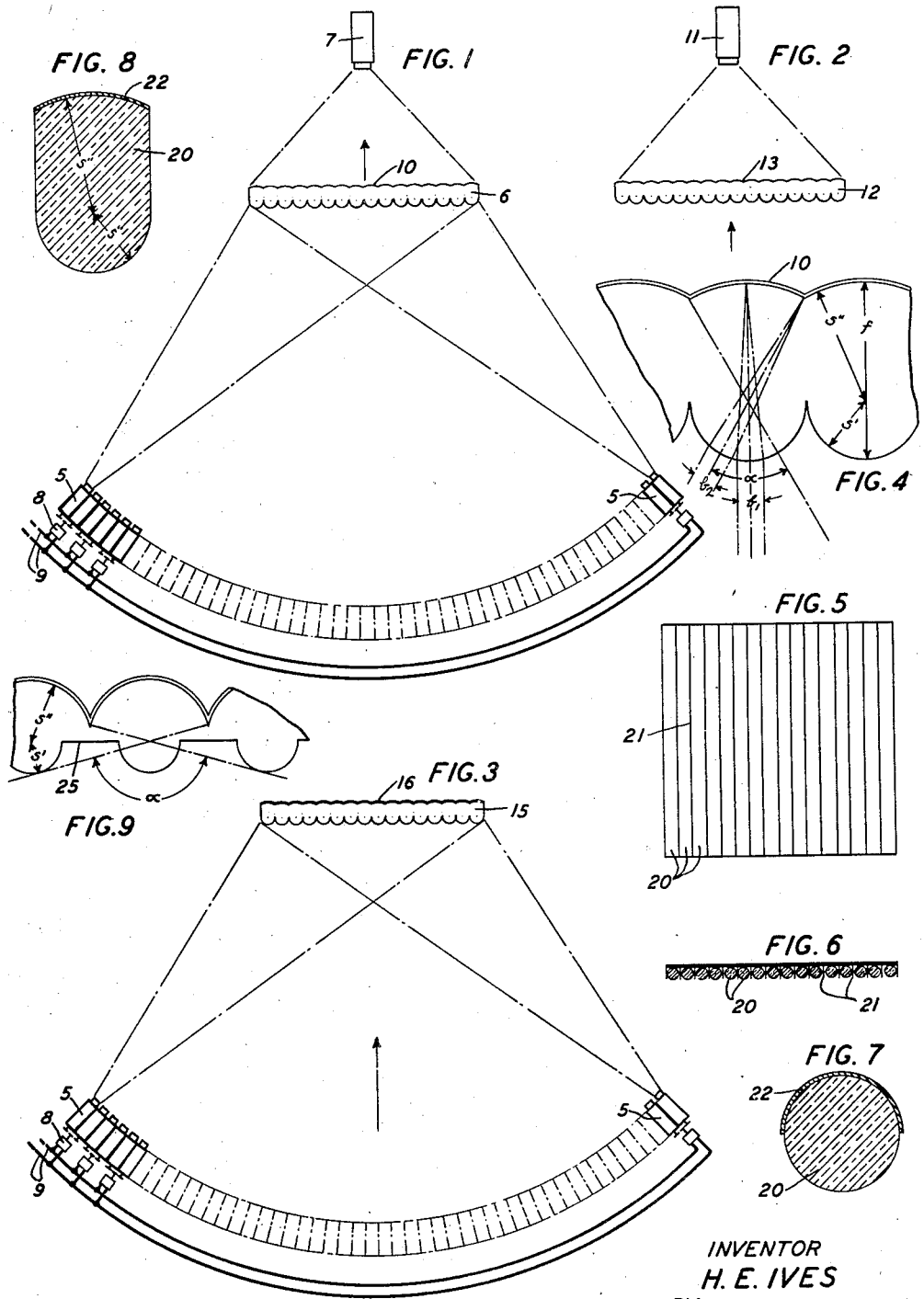
INVENTOR
H. E. IVES
BY
Stanley B. Kent
ATTORNEY Patented Oct. 18, 1932

1,883,290

UNITED STATES PATENT OFFICE

HERBERT E. IVES, OF MONTCLAIR, NEW JERSEY, ASSIGNOR TO BELL TELEPHONE LABORATORIES, INCORPORATED, OF NEW YORK, N. Y., A CORPORATION OF NEW YORK

PROJECTION OF STEREOSCOPIC PICTURES

Application filed October 23, 1930. Serial No. 490,637.

This invention relates to the producing of pictures in stereoscopic relief and more particularly to stereoscopic motion pictures.

An object of the invention is to provide an improved arrangement for obtaining and projecting stereoscopic motion pictures in such a manner that the stereoscopic effect is present when the projected pictures are viewed at different angles and different distances without the use of any instrument at the observer's eye.

This invention is in the nature of an improvement over certain of the features disclosed in a copending application of H. E. Ives, Serial No. 338,642, filed February 9, 1929. In that application a number of arrangements for taking and projecting motion pictures having the characteristics of the parallax panoramagram are described. The term parallax panoramagram is used to characterize a type of transparency stereoscopic picture invented by C. W. Kanolt and disclosed in his Patent No. 1,260,682, granted March 26, 1918. In the parallax panoramagram there is effectively an infinite series of strips, or a panorama, for each linear elemental area of the picture. An opaque line grating is used in which the width of the transparent portion is much less than that of an opaque portion. Such a grating may be said to be of the parallax panoramagram type. In one arrangement a large number of separate motion picture cameras, for example fifty, are set up side by side and all directed to the same object. These cameras are very narrow so that the lenses are in practically juxtaposed position. A complete series of views of the object from all necessary directions is thus taken and form a record of the moving object in the form of a large number of motion picture films. To project from this record there may be set up in place of the original cameras a corresponding number of motion picture projectors all directed toward the same translucent screen which is viewed from the side opposite the projectors. A short distance behind the screen and between it and the projectors is placed an opaque line grating of the parallax panoramagram type, by virtue of which the screen picture produced by each projector is cut up into narrow adjacent strips. Near the screen and between it and the observer is placed a second similar grating through which the observer sees the picture in relief. In order to avoid the use of a large number of projectors in the projecting room of the motion picture theatre, these may be located elsewhere and a separate motion picture may be taken from the position of the observer of the screen but with the grating on that side of the screen removed. The resulting film may then be used to project from a single projector.

A feature of the present invention is a projecting system employing a lenticular diffusing grating or screen for use in place of the opaque line grating and translucent screen above mentioned.

In the following specification a number of arrangements are disclosed by way of illustration for projecting motion pictures having the characteristics of the parallax panoramagram and comprising a lenticular diffusing grating or screen.

In one arrangement the screen used consists of a transparent refracting medium provided on its front and back faces with opposed cylindrical ridges of such curvature that the front ridges focus parallel rays incident in any direction sharply upon the rear ridge surfaces, the rear surfaces being treated to cause diffusion of the light rays. A battery of juxtaposed motion picture projectors arranged in an arc of a circle about the screen project motion pictures on the front ridges of the screen. By using wide angle lenses in the projectors as required, they may be arranged in a straight line parallel to the screen to effect improved definition. The projected picture corresponds to the aspects of the object as viewed from a similar bank of taking cameras pointing toward the object. Each rear ridge surface is thus illuminated in as many parallel strips of light as there are projectors. If the rear surface is translucent a taking camera may be directed from the back toward this surface and a motion picture taken, each frame of which has the characteristics of a parallax panoramagram. If the rear diffusing surface is opaque a moving picture in relief may be seen by viewing the screen from the front, in any plane except the plane of the projecting light beams.

The parallax panoramagram type of moving picture film may be used in a projector to project on the rear ridges of the lenticular screen providing the rear surface is translucent. A motion picture in relief may then be viewed by looking toward the front surface of the screen.

If the transparent material has an index of refraction other than two the front and rear surfaces must have different radii of curvature. If the index of refraction is less than two the radius of a front ridge is less than that of a rear ridge, in which event the angle of viewing may be increased by making the distance between the axes of adjacent ridges greater than the diameter of a front ridge and making the spaces between front ridges black and preferably specular.

The invention will now be described more in detail having reference to the accompanying drawings.

Fig. 1 is an arrangement for producing a parallax panoramagram type of motion picture film from a plurality of motion picture films, each taken from a different direction with respect to the object.

Fig. 2 is an arrangement for projecting motion pictures from such a film for viewing in relief.

Fig. 3 is an arrangement for projecting and viewing motion pictures in relief using a plurality of motion picture films such as are used in Fig. 1.

Fig. 4 is an enlarged view showing the shapes and location of the ridges and representative paths of light rays.

Fig. 5 shows a front view of a modified form of screen structure.

Fig. 6 is a cross-section of the screen of Fig. 5.

Fig. 7 is an enlarged cross-section of one of the lenticular elements of the screen of Fig. 5.

Fig. 8 is an enlarged cross-section of a modified form of lenticular element.

Fig. 9 is a fragmentary cross-section of a modified screen adapted for viewing through a large angle.

Figure 10:
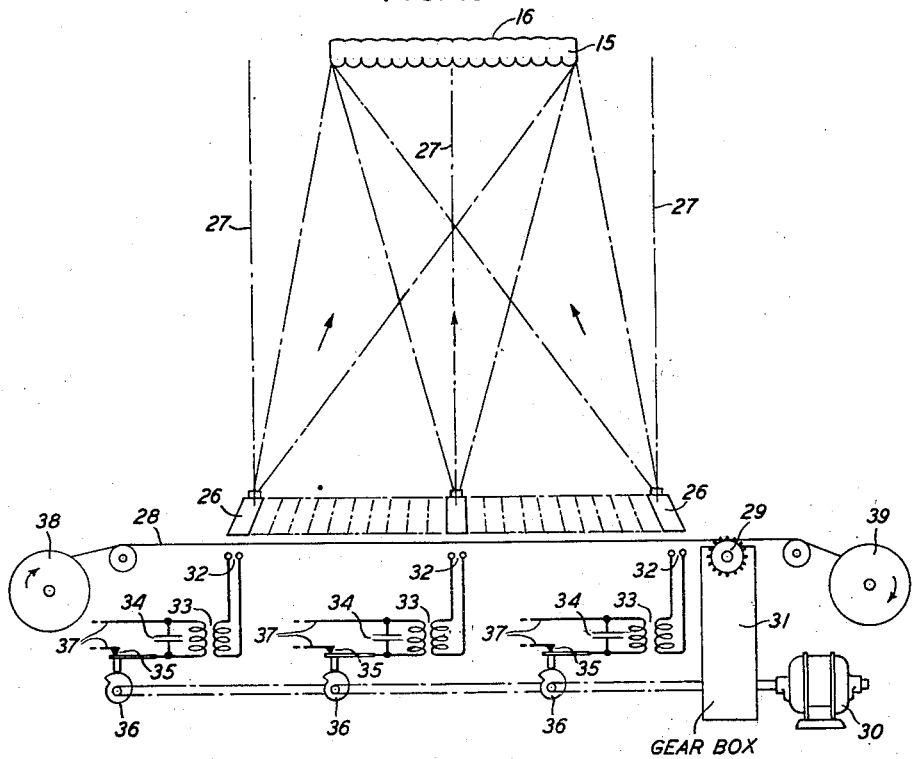
Fig. 10 is a modified form of projector arrangement using a single film.

In the arrangement of Fig. 1 there is shown a plurality of projectors 5 arranged in the arc of a circle with a screen 6 at the center and a motion picture camera 7 directed toward the side of the screen 6 opposite to the projectors 5. In this figure fifty projectors are shown but this number is chosen as being merely representative and corresponds to the number of cameras used in the taking of the original set of films as disclosed in the Ives application supra. The film used in each of these projectors is the motion picture film obtained by photographing the object with a motion picture camera located relatively to the object in the same position as the projector occupies with respect to the screen 6. In taking, the films are driven through the camera by any suitable means such that they are operated synchonously. For projection they are driven through the projector by similar means such that they are projected synchronously. As shown motor 8 drives the first pair of cameras 5 and the succeeding pairs are driven by similar motors. These motors are all energized from the same source of alternating current supplied to the line 9. It will be seen that when these projectors are in operation, each will produce a series of images at the screen 6, each of which series will show the aspects of the object from a different point of view. These projectors are of the type disclosed in the Ives application supra and are much like the projectors ordinarily employed in projecting motion pictures but are preferably much narrower so that the diameter of the projector lens is nearly as great as the width of the projector.

In order to improve the definition the projectors may be arranged in a straight line parallel to the screen, the optical axis of each projector being normal to the screen and the lenses having such an angle width that the image is focussed on the screen in the proper position. The extreme projectors would require the widest angle lenses. This is illustrated in Fig. 10.

The screen 6 consists of a transparent refracting medium, provided on its front and back faces with opposed cylindrical ridges of such curvature that the front ridges focus parallel rays incident in any direction sharply upon the rear ridge surface as shown by the dotted ray paths in Fig. 4. For the sake of clearness a much smaller number of pairs of ridges is shown in the drawings than is actually employed. The number of pairs of ridges actually employed is sufficient to make the ridges themselves practically invisible from the distance at which the picture is ordinarily viewed. The picture projected upon the screen 6 from the projector 5 at the extreme left is made up of a large number of narrow parallel vertical strips produced by light incident upon the front ridges and focussed upon the corresponding rear ridges. Likewise the projected picture from each of the other projectors is made up of a similar series of strips occupying slightly different positions around the rear ridges. The rear surface 10 of screen 6 is rendered translucent by treating the surface of the transparent material of which screen 6 is composed or by covering with a translucent paint.

The motion picture camera 7 is used to photograph the back 10 of the screen 6 receiving upon each frame of its film a composite picture composed of the several pictures taken at slightly different angles in the original photographing operation. The film thus obtained is similar in structure to the positive used in the parallax panoramagram. The camera 7 is operated synchronously with the projectors 5 by any suitable means which, for example, may be a synchronous motor supplied with current from the same source as supplies line 9.

The mode of action of the double ridged screen 6 of Fig. 1 is illustrated in Fig. 4. In that figure $b_1$ and $b_2$ are two bundles of substantially parallel rays each coming from a separate projector 5 striking one of the vertical ridges. They each focus as a narrow vertical line on the diffusing layer 10 on the rear ridge. If the front cylindrical ridges are made with a radius of curvature $s'$ and the medium has a refractive index $n$, simple lens theory gives for the thickness, assuming the rays outside the medium to be parallel, $$f = s'\left(\frac{n}{n-1}\right).$$

The radius of curvature of the rear cylindrical ridges will then be $$s'' = f - s' = \frac{s'}{n-1}$$

the front and rear ridges having the same axis. It follows that the relationship between the refractive index $n$ and the radii $s'$ and $s''$ is $s' = s''(n-1)$. For a refractive index of 1.5 the thickness $f$ will be three times and the rear cylindrical radius twice the front cylindrical radius, while for a refractive index 2 the radii will be the same, that is, the structure will consist of portions of cylinders of circular cross-sections. The angle $\alpha$ between the axes of the extreme bundles of rays focussed on the rear cylinder determines the angle through which the relief picture can be produced. For the case of refractive index 1.5 the angle $\alpha$ is 60 degrees. The angle increases with the refractive index and would be 180 degrees for refractive index 2 except for the practical limitation imposed by the screening action of the ridges upon each other.

A modified form of screen is shown in Fig. 9, which permits of viewing through a larger angle. The transparent material of this screen has a refractive index less than two. The front radius $s'$ is smaller than the rear radius $s''$ and the axes of adjacent ridges are separated by a distance greater than the diameter of a front ridge. A plane surface 25 is thus left between the front ridges and the angle of viewing $\alpha$ is much larger than 60 degrees. In order to prevent scattering of light from these surfaces 25 they are made black and preferably specular in any well known manner. It is not necessary that they be plane surfaces, the essential requirement being that the light from the projectors incident thereon be not reflected to the eyes of the observers.

The film obtained in the camera 7 of Fig. 1 may be used to produce motion pictures in relief according to the arrangement shown in Fig. 2. This film is projected from an ordinary projector 11 upon the back side 13 of a ridged screen 12. This screen may be identical with screen 6 of Fig. 1 or it may be larger or smaller as circumstances may warrant. It is necessary to have the ridged structure in proper registration with the strips of the picture on the translucent back surface 13. The screen is viewed from the opposite side as indicated by the arrow. If the images on the back of the screen 12 are in proper registry with the ridges the picture seen by an observer looking in the direction indicated by the arrow will be in relief. Furthermore, the observer is not limited to a position directly in front of the screen and at a fixed distance therefrom but may be located either above or below or to the right or the left of the center within reasonable limits.

The arrangements for producing moving pictures in relief illustrated in Figs. 1 and 2 have the advantage of requiring only a single projector 11 in the projecting room or theatre. The large bank of projectors 5 shown in Fig. 1 are located only in the copying room. However, very accurate registration of the strips of the picture on the ridged screen is required.

In order to obviate the necessity for this close registration the arrangement of Fig. 3 may be used for the projection of motion pictures in relief. This arrangement is somewhat similar to that of Fig. 1 in that the battery of projectors 5 are arranged to project a series of motion pictures on the front face of a screen 15. This screen has ridged surfaces like screen 6 but has the further properties of efficiently reflecting the light back upon its source as well as diffusing light vertically like an ordinary reflection screen. The rear surface is given a coating of white diffusing paint. The screen 15 has the properties that when the eye moves closer to it the image seen corresponds to a position of observation closer to the original object. As described in connection with Figs. 1 and 4 a bundle of parallel rays, such as $b_1$ and $b_2$, each coming from a separate projector, on striking one of the vertical ridges focusses as a narrow vertical line on the diffusion reflection layer 16 on the rear ridge. An observer stationed in front of the screen 15 and looking at it as indicated by the arrow in Fig. 3 will only see the illuminated rear surface if his eye is placed in the path of the beams $b_1$ and $b_2$, remembering that these ridges are quite small, that is, of width comparable with the diameter of the pupil of the eye. In the horizontal plane no other light can reach the observer's eye from the rear ridge. In the vertical plane due to the diffusion of the light up and down he will see the whole height of the screen illuminated. Imagine a single projector illuminating all the ridges together making up the screen. If an observer places himself exactly above or below the projection lantern he will see the picture in the projector displayed upon the screen. If he moves to either side the picture will disappear. If however, the whole battery of projectors is acting the observer will see a different picture for each horizontal position of observation. The projected picture will accordingly be different to each eye and if the proper pictures are placed in each projector will exhibit stereoscopic relief.

A modified form of screen which is capable of being made up practically is shown in Figs. 5 and 6. The front face of the screen is shown in Fig. 5 and a cross-section in Fig. 6. This screen is built up of a large number of small glass rods 20 of circular cross-section, whose rear surfaces are coated with a matt white layer. If the refractive index of the rod is approximately 2 parallel rays incident upon the face of the screen are reflected back over their own path for the reasons hereinbefore set forth in connection with Fig. 4. If the refractive index of the glass is less than 2 the rods will need to be given a special cross-section in which the rear surface is of larger radius than the front as shown in Fig. 8. Assuming either that glass rods are available of refractive index approximating 2 or the glass can be drawn with the cross-section shown in Fig. 8, the screen is built up in the manner indicated in Figs. 5 and 6 in which a plurality of glass rods 20 are shown lying side by side between thin opaque separators 21. Each rod is given a coating of diffusing white paint 22, as shown in Figs. 7 and 8, which coating is preferably applied after the rear surface of the rod has been given a diffusing character by etching or sand blasting. The glass rods in a practical exemplification might be of approximately one eighth inch diameter, the whole screen being 6 or 8 feet high. With such relative dimensions individual rods would be practically invisible as such. Such a screen would, of course, show specular reflection from the front surface of the rods and for that reason would have to be so inclined with respect to the audience and the direction of projection of the light beams that the specular reflection would be invisible and the image would be seen entirely by the diffused reflection from the back surface of the rods.

Figure 13:
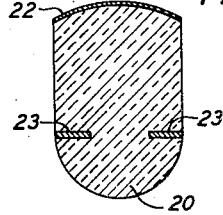
Figs. 12 and 13 are modifications of Figs. 7 and 8, respectively, showing opaque diaphragms.
Figure 12:
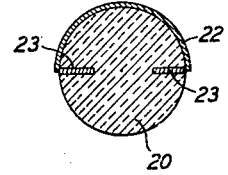

In a modified form of screen scattering of light due to spherical aberration of light rays incident near the edges of the front cylindrical lenses is minimized by the use of a diaphragm effectively in the plane of the axes of the lenticular elements. Preferably each lenticular element is provided with an opaque thin section on each side extending inwardly from the outer edge of the element toward the common axis of the front and back surfaces throughout the length of the element. In the rod type of screens shown in Figs. 5 to 9 these opaque sections may preferably be made by sawing slots down the opposite sides of each rod toward the center in the case of rods of circular cross-section and toward the common axis in the case of rods having different radii of curvature for the front and back surfaces and filling the slots with an opaque black wax or similar material. A suitable depth of slot is one-half the radius of curvature of the front surface. This, of course, may be varied as circumstances warrant. Such a rod of circular cross-section is illustrated in Fig. 12. Such a rod having different radii of curvature for the front and back surfaces is shown in Fig. 13. The wax filled slots 23 extend lengthwise of the rods 20.

The screen may be made up in a variety of ways and from a variety of materials in accordance with the teachings hereinbefore set forth as to shape and form of the ridges. Other arrangements for projecting the plurality of motion pictures on the screens 6 and 15 may be employed. Such modified arrangements are described in the Ives application supra.

Figure 11:
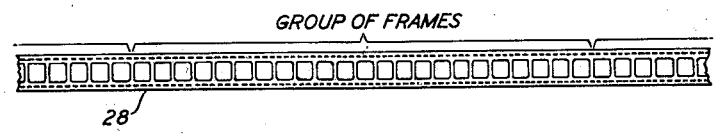
Fig. 11 is a fragmentary showing of the film used in the arrangement of Fig. 10.

The general method of relief picture projection which has been herein described constitutes a definitely successful solution of the problem of throwing on a screen pictures which show relief without the use of any special spectacles or other auxiliary apparatus at the eyes. One practical objection to the method is the large array of projectors required for a group of spectators of any size to be accommodated. Allowing two inches or somewhat less than the interocular distance from center to center of the projectors an auditorium 50 feet wide would need 300 projectors in order that everyone in the cone limited by the size of the screen and the extreme projectors would be able to see the picture. If the screen is to display a moving picture this calls for a corresponding number of motion picture projectors and films. In order for the method to approximate to commercial practicability some means for placing the images in a single film and diverting the projected rays in turn to each direction of projection would appear preferable. This, of course, would require a high quality of optical and mechanical devices and would also require very high speed in projection and intense light sources. Reasonably good projection on a very modest scale, might be accomplished by feeding the battery of projectors a single film passing through from side to side continuously, say from left to right, and having its pictures in groups of the number of projectors. As each group came into position so that each projector had its appropriate picture, an instantaneous exposure could be given by say a high power spark. Such an arrangement is illustrated in Figs. 10 and 11.

This arrangement is similar to that of Fig. 3 in that a plurality of appropriate images are projected upon the front face of screen 15, which images are viewed from the same side of the screen by observers looking at it in the direction indicated by the arrows. The images are projected by the projectors 26 provided with the necessary wide angle lenses as hereinbefore mentioned. The optical axis of each projector, three of which are indicated by the dot and dash lines 27, is perpendicular to a plane passing through the axes of the ridges. The optical axes may therefore be said to be perpendicular to the screen. The film 28 is moved continuously through the projectors 26 from left to right by the sprocket wheel 29 which is driven by motor 30 through a suitable gear train in gear box 31. Each projector is provided with a spark gap 32 and a well-known source of high tension current comprising a transformer 33, a condenser 34 and a breaker switch 35 with cam 36. The terminals 37 may be connected to individual direct current sources or to a common direct current source. The cams 36 are all driven by motor 30. The film 28 has groups of frames corresponding to the number of projectors. The gear ratio in the gear box 31 is so chosen that when the frames of a group of frames are in proper registry with the projectors, the breaker switches 35 are all opened simultaneously to produce sparks in the spark gaps 32 to project pictures on the screen 15. When the next group of frames come into registry with the projectors, another set of sparks are produced to project another set of pictures. The succeeding projections occur within the period of persistence of vision so that motion may be portrayed. As the film moves it unwinds from supply reel 38 and is taken up on take-up reel 39.

Obvious modifications of the specific arrangements disclosed may be made coming within the purview of this invention.

What is claimed is:

1. In apparatus for producing images in relief, a diffusing screen comprising a transparent element having a plurality of parallel cylindrical ridges on one surface and a like number of cylindrical ridges on the other surface, the ridges of said one surface being paired with those of the other respectively and the ridges of each pair being coaxial, means on said other surface for causing diffusion of light rays incident thereon, and means to project on said one surface of said screen from a corresponding position of a corresponding plurality of positions around said screen transverse to said ridges each image of a plurality of images representative of an object as viewed respectively from a large number of closely adjacent points of view.

2. In apparatus for producing images in relief, a diffusing screen comprising a transparent element having a plurality of parallel cylindrical ridges on one surface and a like number of cylindrical ridges on the other surface, the ridges of said one surface being paired with those of the other respectively and the ridges of each pair being coaxial, an opaque reflecting diffusion material in contact with the ridges on said other surface, and means to project on said one surface of said screen from a corresponding position of a corresponding plurality of positions around said screen transverse to said ridges each image of a plurality of images representative of an object as viewed respectively from a large number of closely adjacent points of view.

3. In apparatus for producing images in relief, a diffusing screen comprising a transparent element having a plurality of parallel cylindrical ridges on one surface and a like number of cylindrical ridges of different curvature from said first named ridges on the other surface, the ridges of said one surface being paired with those of the other respectively and the ridges of each pair being coaxial, means on said other surface for causing diffusion of light rays incident thereon, and means to project on said one surface of said screen from a corresponding position of a corresponding plurality of positions around said screen transverse to said ridges each image of a plurality of images representative of an object as viewed respectively from a large number of closely adjacent points of view.

4. In apparatus for producing images in relief, a diffusing screen comprising a transparent element having a plurality of parallel cylindrical ridges on one surface and a like number of cylindrical ridges of different curvature from said first named ridges on the other surface, the ridges of said one surface being paired with those of the other respectively and the ridges of each pair being coaxial, a matt white coating on said other surface, and means to project on said one surface of said screen from a corresponding position of a corresponding plurality of positions around said screen transverse to said ridges each image of a plurality of images representative of an object as viewed respectively from a large number of closely adjacent points of view.

5. In apparatus for producing images in relief, a diffusing screen comprising a transparent element having a plurality of parallel cylindrical ridges on one surface and a like number of cylindrical ridges of different curvature from said first named ridges on the other surface, the ridges of said one surface being paired with those of the other respectively and the ridges of each pair being coaxial, an opaque reflecting diffusion material in contact with said other surface, and means to project on said one surface of said screen from a corresponding position of a corresponding plurality of positions around said screen transverse to said ridges each image of a plurality of images representative of an object as viewed from a large number of closely adjacent points of view.

6. In apparatus for producing images in relief, a diffusing screen comprising a transparent element having a plurality of parallel cylindrical ridges on one surface and a like number of cylindrical ridges of different curvature from said first named ridges on the other surface, the ridges of said one surface being paired with those of the other respectively and the ridges of each pair being coaxial, a translucent material on said other surface, and means to project on said one surface of said screen from a corresponding position of a corresponding plurality of positions around said screen transverse to said ridges each image of a plurality of images representative of an object as viewed respectively from a large number of closely adjacent points of view.

7. In apparatus for producing images in relief, a diffusing screen comprising transparent material having a refractive index $n$, a set of parallel cylindrical ridges on one side of said screen having a radius of curvature $s'$, a second set of cylindrical ridges on the other side of said screen having a radius of curvature $s''$, the ridges of said first set being paired with those of said second set respectively, the ridges of each pair being coaxial, and the refractive index $n$ and the radii $s'$ and $s''$ having the relationship $s'=s''(n-1)$, means to cause diffusion of light rays on the surface of said second set of ridges, and means to project on the first set of ridges of said screen from a corresponding position of a corresponding plurality of positions around said screen transverse to said ridges each image of a plurality of images representative of an object as viewed respectively from a large number of closely adjacent points of view.

8. In apparatus for producing images in relief, a diffusing screen comprising transparent material having a refractive index $n$, a set of parallel cylindrical ridges on one side of said screen having a radius of curvature $s'$, a second set of cylindrical ridges on the other side of said screen having a radius of curvature $s''$, the ridges of said first set being paired with those of said second set respectively, the ridges of each pair being coaxial, and the refractive index $n$ and the radii $s'$ and $s''$ having the relationship $s'=s''(n-1)$, a matt white coating on the surface of said second set of ridges, and means to project on said first set of ridges of said screen from a corresponding position of a corresponding plurality of positions around said screen transverse to said ridges each image of a plurality of images representative of an object as viewed respectively from a large number of closely adjacent points of view.

9. In apparatus for producing images in relief, a diffusing screen comprising transparent material having a refractive index $n$, a set of parallel cylindrical ridges on one side of said screen having a radius of curvature $s'$, a second set of cylindrical ridges on the other side of said screen having a radius of curvature $s''$, the ridges of said first set being paired with those of said second set respectively, the ridges of each pair being coaxial, and the refractive index $n$ and the radii $s'$ and $s''$ having the relationship $s'=s''(n-1)$, an opaque reflecting diffusion material in contact with said second set of ridges, and means to project on said first set of ridges of said screen from a corresponding position of a corresponding plurality of positions around said screen transverse to said ridges each image of a plurality of images representative of an object as viewed respectively from a large number of closely adjacent points of view.

10. In apparatus for producing images in relief, a diffusing screen comprising a transparent element having a plurality of parallel cylindrical ridges on one surface and a like number of cylindrical ridges on the other surface, the ridges of said one surface being paired with those of the other respectively and the ridges of each pair being coaxial, means on said other surface for causing diffusion of light rays incident thereon, an opaque element extending from each edge of each ridge of said first mentioned plurality of ridges toward the axis of the corresponding ridge, and means to project on said one surface of said screen from a corresponding position of a corresponding plurality of positions around said screen transverse to said ridges each image of a plurality of images representative of an object as viewed respectively from a large number of closely adjacent points of view.

11. In apparatus for producing images in relief, a diffusing screen comprising a plurality of glass rods arranged side by side, means on the surfaces of said rods which form one surface of said screen for causing diffusion of light rays incident thereon, and means to project on the other surface of said screen from a corresponding position of a corresponding plurality of positions around said screen transverse to said rods each image of a plurality of images representative of an object as viewed respectively from a large number of closely adjacent points of view.

12. In apparatus for producing images in relief, a diffusing screen comprising a plurality of cylindrical glass rods of circular cross-section and of refractive index of approximately two arranged side by side, an opaque matt white coating on the surfaces of said rods which form one surface of said screen, and means to project on the other surface of said screen from a corresponding position of a corresponding plurality of positions around said screen transverse to said ridges each image of a plurality of images representative of an object as viewed respectively from a large number of closely adjacent points of view.

13. In apparatus for producing images in relief, a diffusing screen comprising a plurality of cylindrical glass rods of circular cross-section and of refractive index approximately two arranged side by side, an opaque separator between each pair of adjacent rods, an opaque matt white coating on the surfaces of said rods which form one surface of said screen, and means to project on the other surface of said screen from a corresponding position of a corresponding plurality of positions around said screen transverse to said ridges each image of a plurality of images representative of an object as viewed respectively from a large number of closely adjacent points of view.

14. In apparatus for producing images in relief, a diffusing screen comprising a transparent element having a plurality of parallel cylindrical ridges on one surface and a like number of cylindrical ridges on the other surface, the ridges of said one surface being paired with those of the other respectively and the ridges of each pair being coaxial, means on said other surface for causing diffusion of light rays incident thereon, means to project on said one surface of said screen from a corresponding position of a corresponding plurality of positions around said screen transverse to said ridges each image of a plurality of images representative of an object as viewed respectively from a large number of closely adjacent points of view, and a camera to photograph the composite parallax panoramagram picture on the other surface of said screen.

15. In apparatus for producing images in relief, a diffusing screen comprising a transparent element having a plurality of parallel cylindrical ridges on one surface and a like number of cylindrical ridges on the other surface, the ridges of said one surface being paired with those of the other respectively and the ridges of each pair being coaxial, means on said other surface for causing diffusion of light rays incident thereon, means to project on said one surface of said screen from a corresponding position of a corresponding plurality of positions around said screen transverse to said ridges each image of a plurality of images representative of an object as viewed respectively from a large number of closely adjacent points of view, a camera to photograph the composite parallax panoramagram picture on the other surface of said screen, a second diffusing screen comprising a transparent element having a plurality of parallel cylindrical ridges on one surface and a like number of cylindrical ridges on the other surface, the ridges of said one surface being paired with those of the other respectively and the ridges of each pair being coaxial, means on said other surface of said second screen for causing diffusion of light rays incident thereon, and means to project said parallax panoramagram picture on the other surface of said second screen so that the strips of the picture register with the ridges of the screen.

16. In apparatus for producing images in relief, a diffusing screen comprising a transparent element having a plurality of parallel cylindrical ridges on one surface and a like number of cylindrical ridges of different curvature from said first named ridges on the other surface, the ridges of said one surface being paired with those of the other respectively and the ridges of each pair being coaxial, translucent material on said other surface, and means to project pictures from a parallax panoramagram record on the translucent material of said screen.

17. In apparatus for producing images in relief, a diffusing screen comprising a transparent element having a plurality of parallel cylindrical ridges on one surface and a like number of cylindrical ridges of different curvature from said first named ridges on the other surface, the ridges of said one surface being paired with those of the other respectively and the ridges of each pair being coaxial, translucent material on said other surface, and means to project a series of parallax panoramagram frames of a motion picture film on the translucent material of said screen.

18. In apparatus for producing motion pictures in relief, a diffusing screen comprising transparent material having a refractive index $n$, a set of parallel cylindrical ridges on one side of said screen having a radius of curvature $s'$, a second set of cylindrical ridges on the other side of said screen having a radius of curvature $s''$, the ridges of said one surface being paired with those of the other respectively, the ridges of each pair being coaxial, and the refractive index $n$ and the radii $s'$ and $s''$ having the relationship $s'=s''(n-1)$, translucent material on the surface of said second set of ridges, and means to project a picture from a parallax panoramagram record on the translucent material of said screen.

In witness whereof, I hereunto subscribe my name this 21st day of October, 1930.

HERBERT E. IVES.